United States Patent [19]

Kohno

[11] Patent Number: 5,509,963
[45] Date of Patent: Apr. 23, 1996

[54] SEED SUPPLY AND COATING APPARATUS

[75] Inventor: Yasushi Kohno, Susono, Japan

[73] Assignee: Yazaki Corporation, Tokyo, Japan

[21] Appl. No.: 339,712

[22] Filed: Nov. 14, 1994

[30] Foreign Application Priority Data

Nov. 15, 1993 [JP] Japan .................. 5-284769

[51] Int. Cl.⁶ .................................. A23G 3/00
[52] U.S. Cl. .................. 118/23; 118/29; 118/303; 118/423
[58] Field of Search .................. 118/303, 423, 118/23, 29; 427/4, 212, 213.35; 47/57.6

[56] References Cited

U.S. PATENT DOCUMENTS

| | | |
|---|---|---|
| 4,806,357 | 2/1989 | Garrett et al. .................. 427/4 |
| 5,080,925 | 1/1992 | Kouno .................. 427/4 |
| 5,254,358 | 10/1993 | Kouno et al. .................. 427/4 |

*Primary Examiner*—Laura Collins
*Attorney, Agent, or Firm*—Nikaido, Marmelstein, Murray & Oram

[57] ABSTRACT

In a seed supply mechanism for seed coating/processing apparatus, a seed stirring mechanism is provided. A case within which seeds ape accommodated is provided with an opening into which a seed sucking nozzle is inserted and an air jet nozzle. The air jet nozzle for the seed stirring mechanism is connected to an air pressure source through an exchanging valve by a hose The seed sucking nozzle sucks a seed floating by air jetted from the air jet nozzle. Thus, only one seed can be surely sucked when the sucking operation is once carried out.

4 Claims, 7 Drawing Sheets

SEED SUPPLY AND COATING APPARATUS

BACKGROUND OF THE INVENTION

1. Field of the Invention

The present invention relates to a seed supply mechanism for a seed coating/processing which automatically gathers seeds, from a large number of seeds accommodated within a seed vessel, to supply the gathered seeds to a gel extruding mechanism.

2. Description of the Prior Art

The seed supply mechanism is one of the units used in a seed coating/processing apparatus.

The seed coating/processing apparatus serves to coat seeds with a gel containing nutritive material and sanitizer for the seeds for protection, and also automatically successively carries out the seed coating/processing which gel-coats the seeds to make the coating of each seed spherical and to increase the diameter of the seed by gel-coating.

The seed supply mechanism in the seed coating/processing apparatus is provided over the gel extruding mechanism for producing a gel film. Incidentally, actually, sol of water solution containing mainly natrium alginate is extruded. When the concentration of the sol is increased, it serves as gel of calcium alginate.

Figure 7:
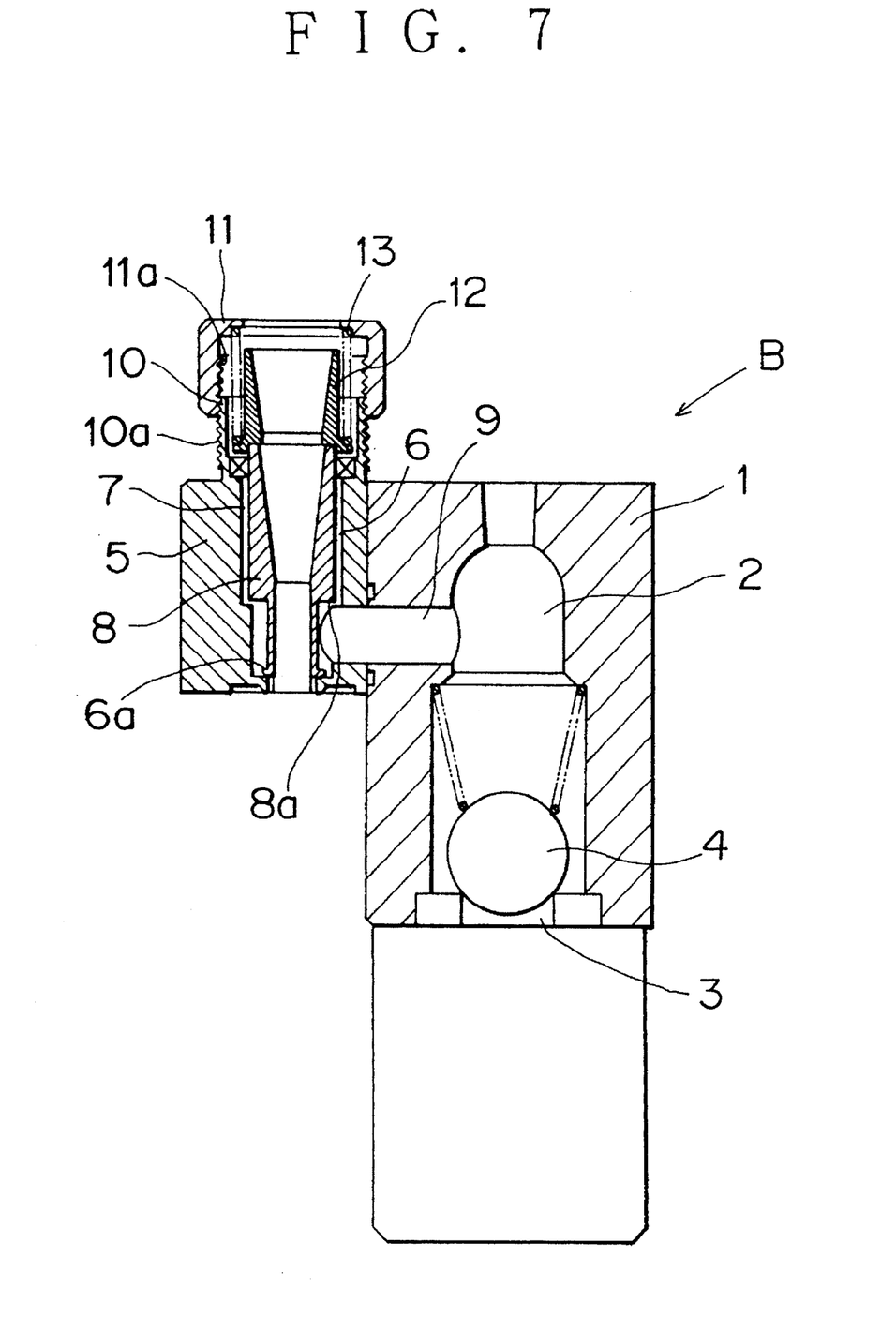
FIG. 7 is a longitudinal cross-sectional view for explaining the gel extruding mechanism for a seed coating/processing apparatus.

The outline of the gel extruding mechanism will be explained below. As shown in FIG. 7, within a substantially rectangular parallelepiped valve body 1, a space 2 communicating with a gel pushing plunger (not shown) is formed. To an opening 3 of the lower end surface of the valve body 1, a pipe path (not shown) communicating with a gel reservoir is attached. Between the opening 3 and the space 2, a check valve whose opening 3 is opened/closed by a steel ball is formed. To the left side of the valve body, a valve case 5 is attached.

In the valve case 5, a flange 6a of a metallic nozzle plunger 8 is located at the lower end of a plunger insertion hole which vertically penetrates through the case 5; a bushing 7 is fit in the interior of the plunger insertion hole 6; and the nozzle plunger 8 which is hollow-cylindrical is inserted in the interior of the bushing 7 so that it can rise/fall.

The outer periphery of the nozzle plunger 8 forms a pressure receiving surface 8a at a lower half portion with a decreased diameter.

A gel flow path 9 which communicates the plunger insertion hole 6 with the space 2 is provided. The gel in the gel reservoir is supplied to the space 2 through the opening 3 and the check valve, and filled in the gel flow path 9 and the plunger insertion hole 6.

To the upper surface of the valve case 5, a cylindrical portion 10 surrounding the plunger insertion 6 is attached so that a female screw 11a provided in the interior of a spring adjuster 11 is screwed to a male screw 10a provided on the outer periphery of the cylindrical portion 10.

A spring receiver 12 is located on the nozzle plunger 8, and a spring 13 is inserted between the spring receiver 12 and the spring adjuster 11.

Thus, although the lower end of the nozzle plunger 8 forced downward closes its flange 6a, when the gel pushing plunger protrudes to boost the pressure of the gel, the pressure receiving surface 8a is pushed. As a result, the nozzle plunger 8 rises to open the valve so that the gel is extruded. When the gel pushing plunger retreats to lower the gel pressure, the nozzle plunger 8 lowers to open the valve and the gel is supplied from the check valve.

When the nozzle plunger 8 lowers to close the valve, the extrusion of the gel is stopped. The gel remaining on the lower surface of the valve sheet 6a forms the gel film coating the lower portion of the plunger insertion hole 6 by surface tension, and the gel film hangs down because of its own weight.

In synchronism with this, when seeds are dropped and supplied from a seed supply device provided above, gel-coated seeds are formed. These seeds drop together with the gel supplemented by next valve opening and supplied to a hardening reservoir while they form ball shapes because of surface tension.

The seed supply device is constituted as follows as disclosed in U.S. Pat. No. 5,254,358. To both ends of a rotating arm which rotates by 180° by a rotary actuator, a hollow sucking nozzles each with its front end tapered is attached in such a manner that the tip is downward. The rear end is communicated with an air pressure source and a negative pressure source through an exchanging valve. A seed vessel is provided just below the sucking nozzle attached to the one end of the rotating arm and is provided so that it can rise and fall (otherwise, the sucking nozzle may be attached to the tip of the rod of an air cylinder for rise/fall). A gel extrusion mechanism is provided so that the nozzle plunger is located just below the sucking nozzle attached to the other end of the rotating arm.

The seed vessel rises to insert the tip of the sucking nozzle into a large number of seeds in the seed vessel. With the pressure in the sucking nozzle being negative, the seed(s) is thereinto. Thereafter, a rotating arm is rotated to release the negative pressure in the sucking nozzle (or to supply the air pressure into the sucking nozzle) so that the seed(s) is dropped and supplied into the gel film through the nozzle plunger 8.

The seed coating/processing apparatus described above has the following drawbacks.

By synchronously operating the seed supply device and gel extrusion mechanism, the coating/processing of seeds can be automatically carried out. But, there are several kinds of sizes and shapes of the seeds. Seeds having sharp tips such as lettuce and very minute seeds such as seeds of a celery flower are likely to be simultaneously sucked to the tip of the sucking nozzle when a sucking operation is once carried out. Thus, a redundant number of seeds are coated and processed together.

SUMMARY OF THE INVENTION

An object of the present invention is to solve the drawbacks of the prior art and to provide a seed supply mechanism for a seed coating/processing apparatus which can suck only one seed when a sucking operation is once carried out.

In order to achieve the above object, in accordance with the present invention, there is provided a seed supply mechanism for a seed coating/supplying apparatus comprising:

on the surface of a stand, a rotary actuator, a rotary arm fixed to a rotary shaft of said rotary actuator, a cylinder fixed to both ends of the rotary arm so that its rod is downward, the cylinder being capable of moving vertically, and a first and second seed sucking nozzles attached to the lower end of the rod, and a tube connected to the seed sucking nozzle, said tube communicating with an air pressure source and a negative pressure source;

on the one side of the stand, a seed stirring case including a seed vessel having an opening and for accommodating seeds which is just below the first seed sucking nozzle at a rotating end and a stirring mechanism for stirring seeds in the seed vessel so that they float; and on the other side of the stand, a gel extruding mechanism for the seed coating/processing device just below the second seed sucking nozzle at the rotating end, wherein said rotating arm rotates by 180° to locate the seed sucking nozzles at the positions corresponding to the seed stirring case and the gel extruding mechanism.

The stirring mechanism may be an air jet nozzle whose front end is inserted into said seed vessel and whose rear end communicates with an air pressure source through an opening/closing valve, or otherwise may be a vibration generating device supporting the seed vessel.

An explanation will be given of the process of the seed supply mechanism for the seed coating/processing constructed described above in the order of operation.

It is assumed that a large number of seeds are accommodated in a seed vessel, one sucking nozzle is located just above the opening of the seed vessel, and the other sucking nozzle is located just above the gel extrusion mechanism.

The seeds in the seed vessel float while they are stirred by the action of a stirring mechanism, and the distance among the floating seeds is relatively large.

The sucking nozzle falls by the action of an air cylinder and temporarily stops in the neighborhood of the floating seeds via the opening of the seed vessel. When the internal pressure of the sucking nozzle is made negative by an exchanging valve, the seed nearest to the sucking nozzle is sucked by the sucking nozzle so that the tip of the sucking nozzle is closed. Thus, the degree of the negative pressure in the sucking nozzle is increased and the tip of the sucking nozzle is closed by the seed. As a result, other seeds will not be sucked.

The sucking nozzle rises, and the rotary actuator rotates. When the sucking nozzle having sucked the seed comes just above the gel extruding mechanism, supply of the negative pressure is stopped by the exchanging valve. Then, the seed is dropped and supplied onto the gel film in the gel extruding mechanism.

In order to drop the seed surely, air pressure may be supplied by the exchanging valve.

In accordance with the present invention, even with respect to seeds having sharp tips such as lettuce and very minute seeds such as seeds of a celery flower, a plurality of seed will not be simultaneously sucked to the tip of the sucking nozzle when a sucking operation is once carried out. This solves the problem of variations in the number of seeds in the gel film.

The above and other objects and features of the present invention will be more apparent from the following description taken in conjunction with the accompanying drawings.

DESCRIPTION OF THE PREFERRED EMBODIMENTS

Now referring to the drawings, an explanation will be given of an embodiment of the present invention.

Figure 1:
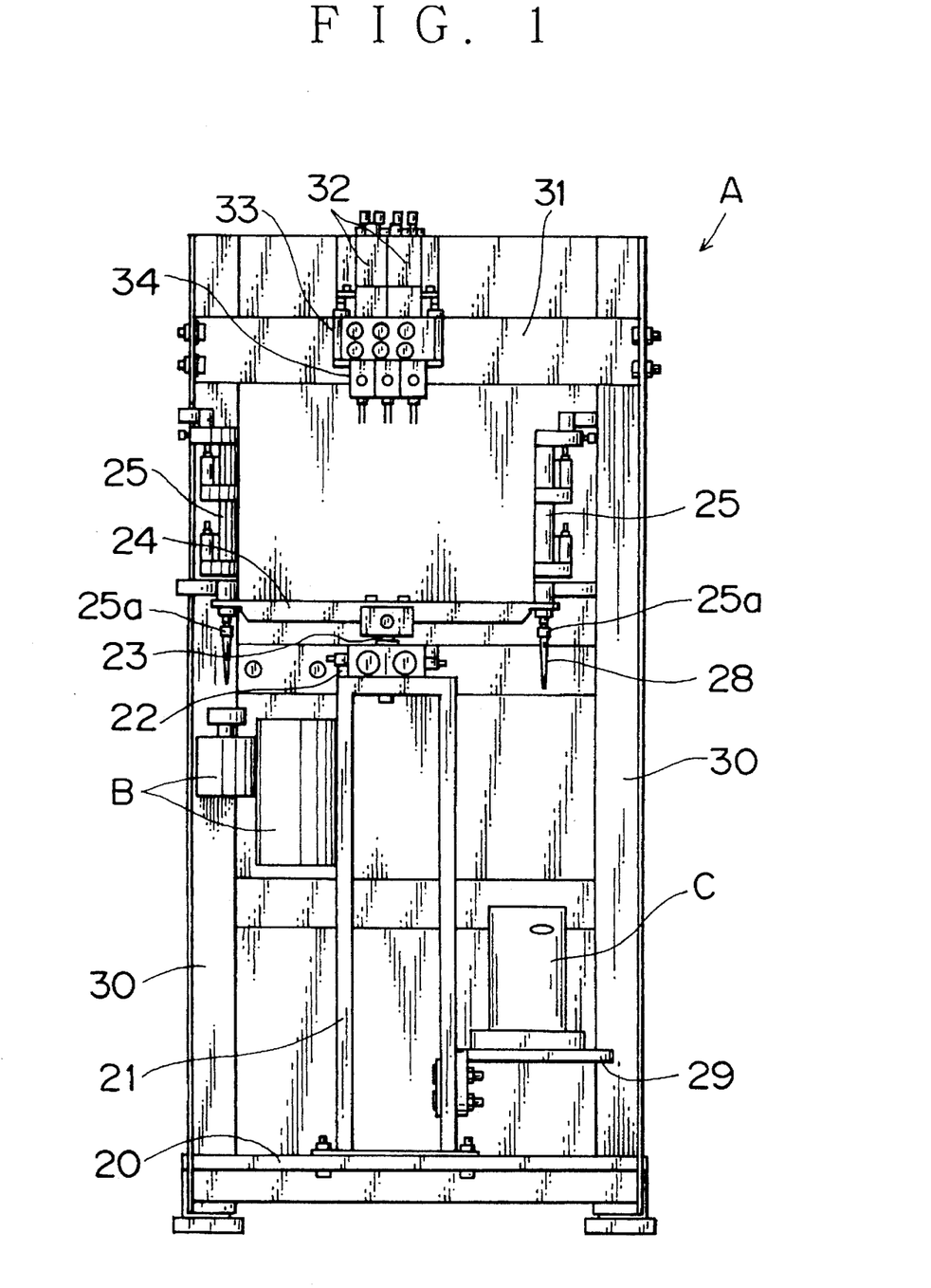
FIG. 1 is a front view of a seed coating/processing apparatus A.
Figure 2:
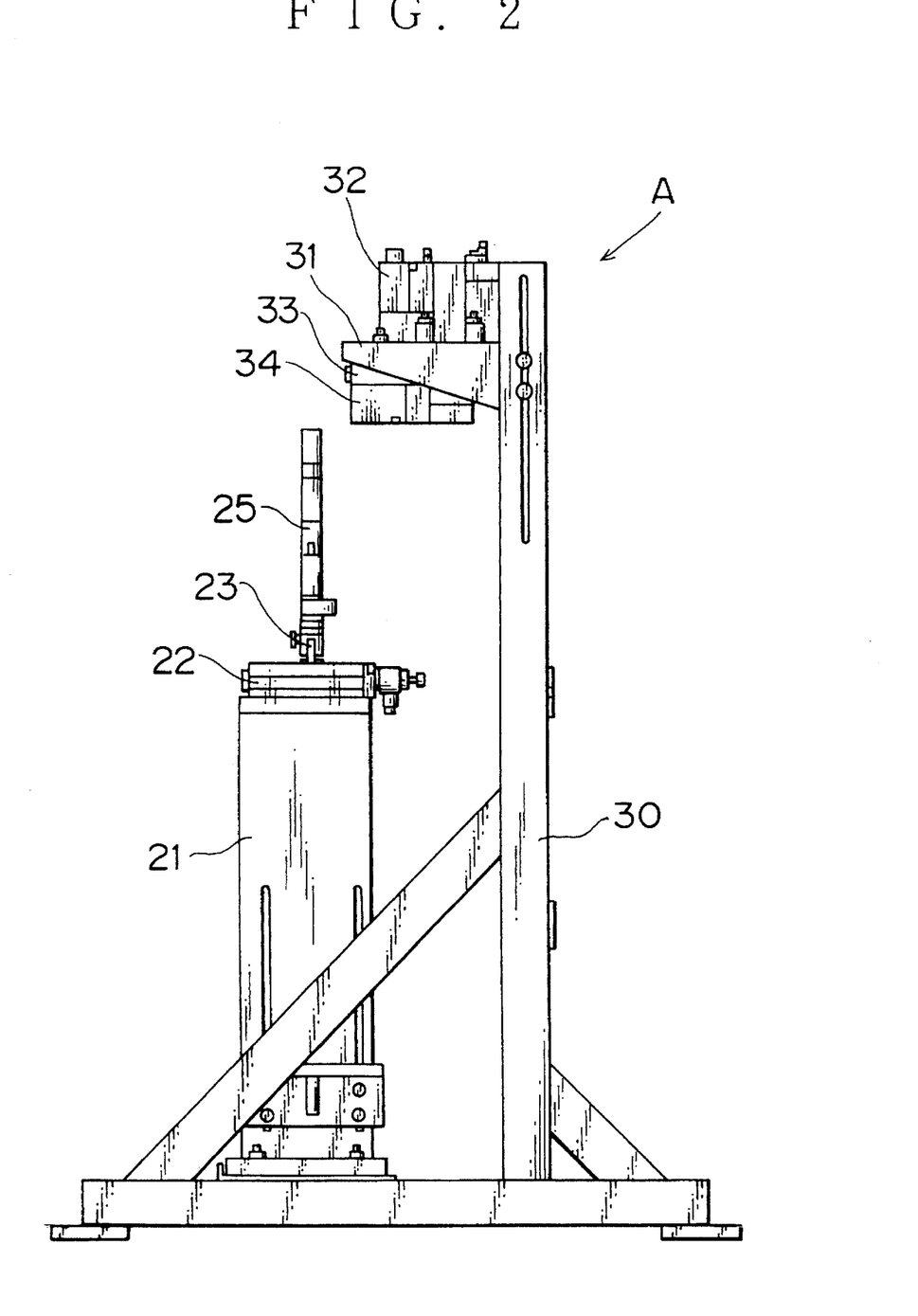
FIG. 2 is a side view of the apparatus shown in FIG. 1.
Figure 3:
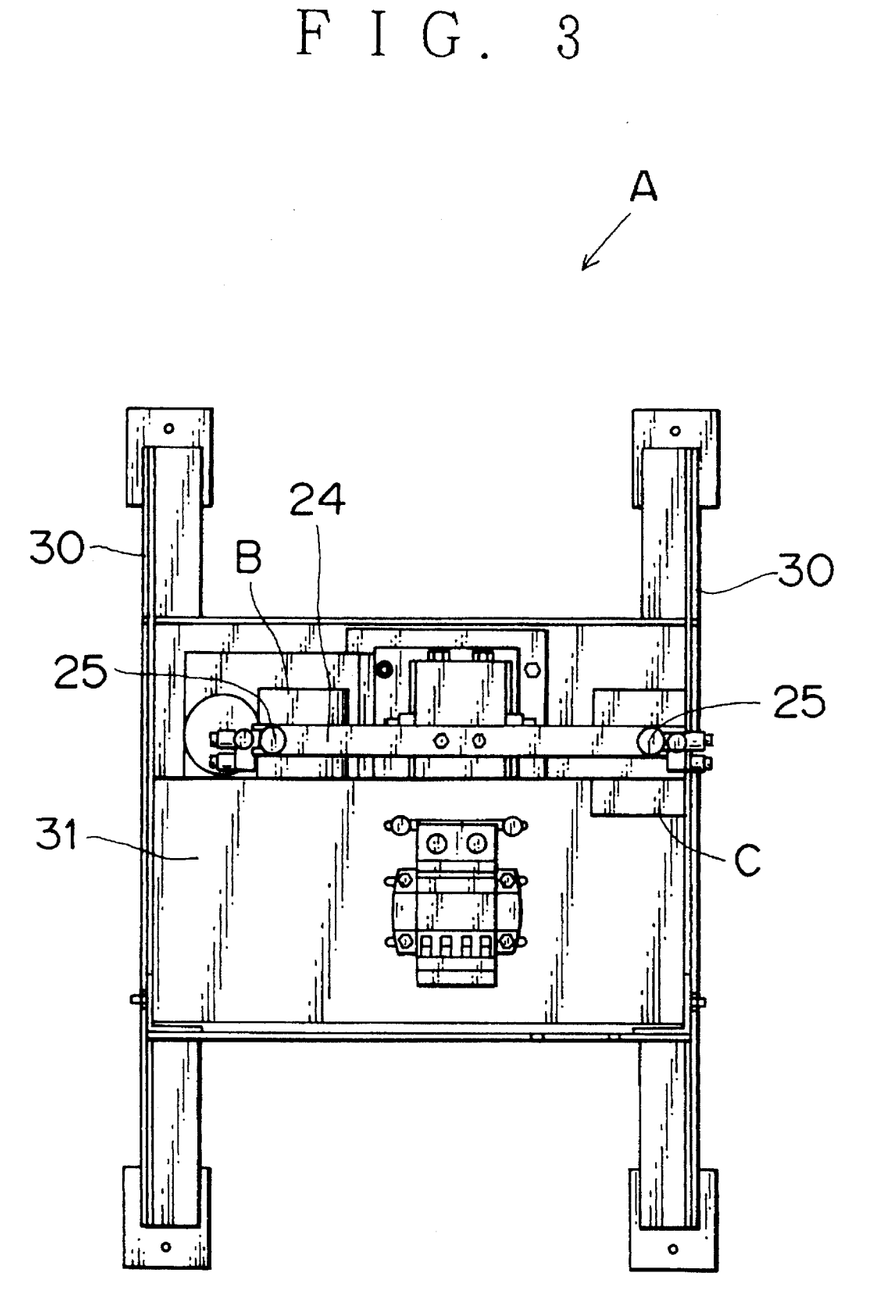
FIG. 3 is a plan view of the apparatus shown in FIG. 1.

FIG. 1 is a front view of a seed coating/processing apparatus A; FIG. 2 is a side view of the apparatus shown in FIG. 1; and FIG. 3 is a plan view of the apparatus shown in FIG. 1.

As shown in FIG. 1, a rack 21 is bolted to the upper surface of a stand plate 20. On the upper surface of the rack 21, a thin type rotary actuator 22 is attached.

The rotary actuator 22 is an air driving system in which the amount of rotation is restricted to 180°.

On the rotating portion of the rotary actuator 22, a rotary shaft 23 is provided. To the rotating shaft 23, the center portion of a rotating arm 24 is bolted.

Figure 4:
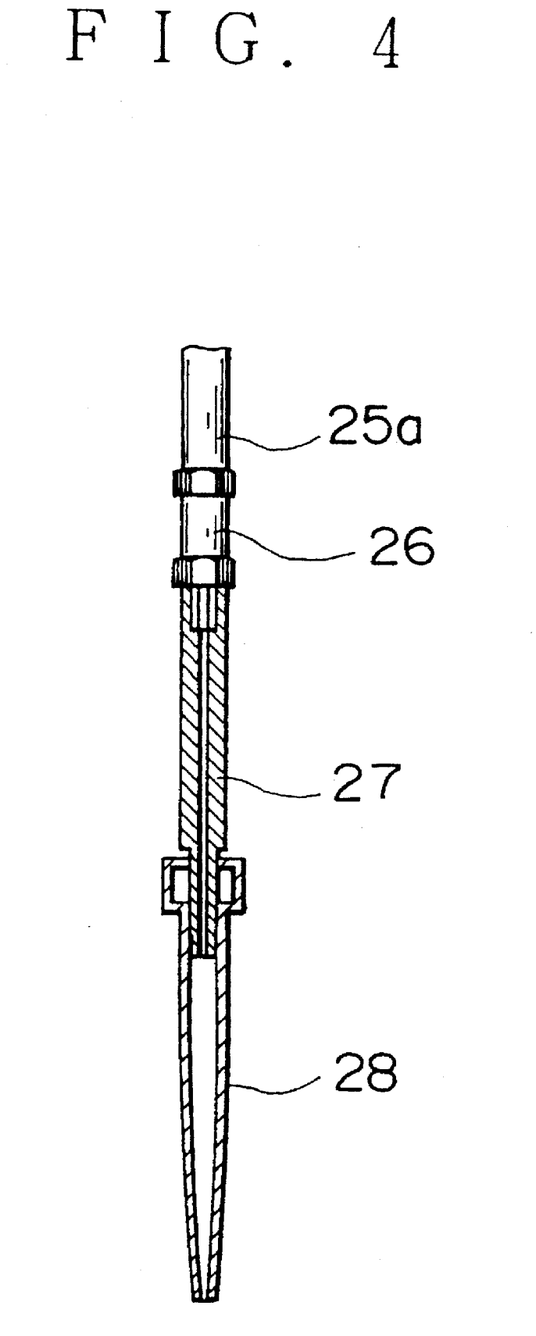
FIG. 4 is a front view of a seed sucking nozzle.

To both ends of the rotating arm 24, air cylinders 25, whose rods 25a are directed downward are attached. To the tip of each of the rods 25a, a tube joint 26 is attached. To the tip of the pipe joint 26, a short tube 27 is connected. To the tip of the short tube 27, a seed sucking nozzle 28 is removably attached (FIG. 4).

The seed sucking nozzle 28, which is a tapered hollow cylindrical tube made of plastic, is fit in the short tube 27 by elastic force of the plastic.

The opening at the tip of the seed sucking nozzle 28 has a size appropriate to be closed by a single seed. The opening may have an appropriate size according to the size of a seed.

In FIG. 1, to the left side of the rack 21, the same gel extruding mechanism B as in the prior art is attached. On a placement stand 29 attached to the right side of the rack 21, a seed stirring case C which will be described later is attached.

On the stand plate 20, two frames 30 are provided vertically and the upper ends of both frames 30 are coupled with each other by a unit stand 31.

Fixed in the unit stand 31 are a unit 32 for generating positive air pressure and negative air pressure, a manifold 33 connected to the positive air pressure supply path and negative air pressure supply path of the unit 32 and a plurality of exchanging valves 34 coupled with the respective exits of the manifold 33. Hoses (not shown) are connected from the exchanging valves 34 to the rotary actuator 22, air cylinders 25, the tube joints 26 of the seed sucking nozzles 28 and the air jet nozzle 52 of a seed stirring case C described below, respectively.

Figure 5:
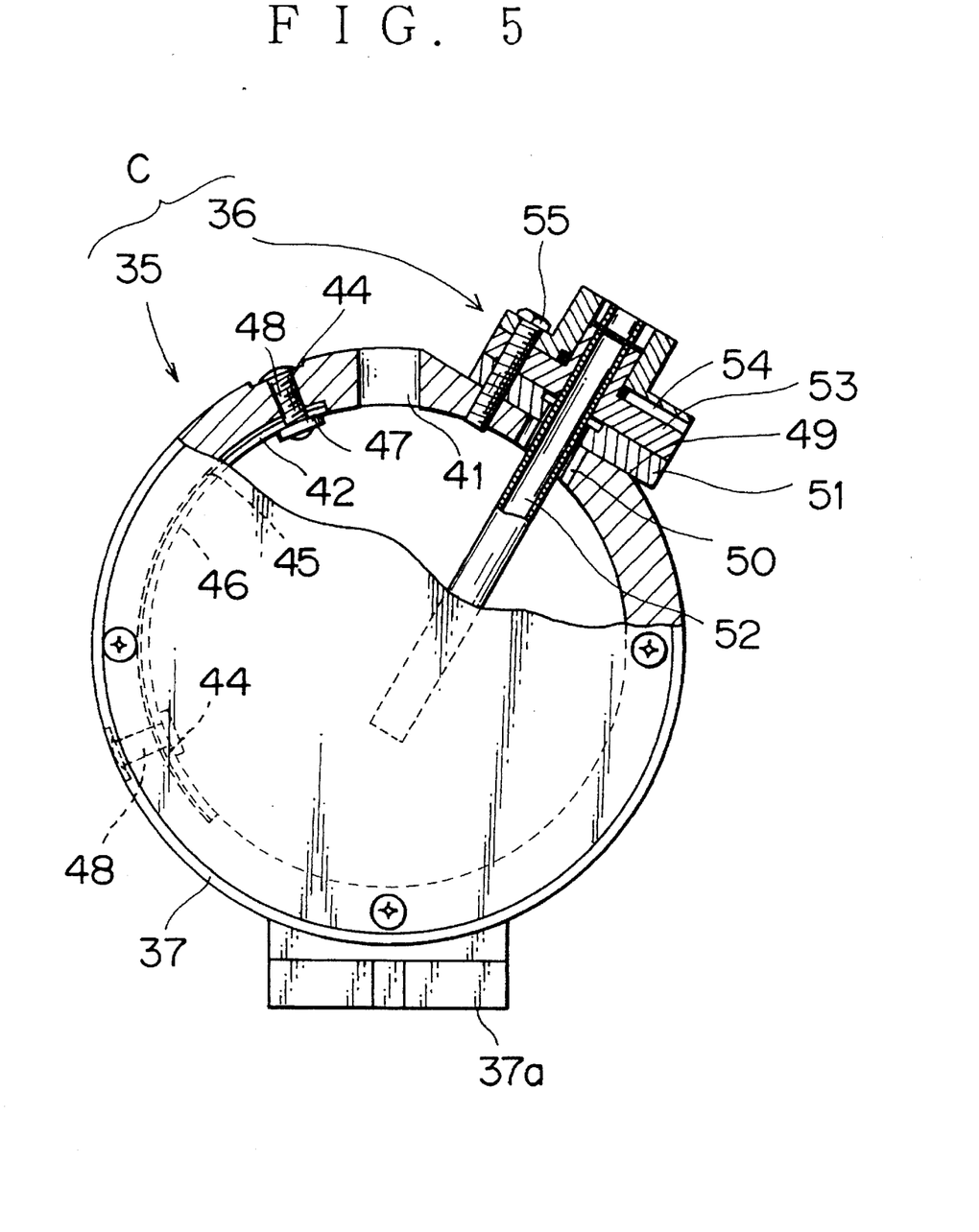
FIG. 5 is a partially-broken front view of a seed stirring case.
Figure 6:
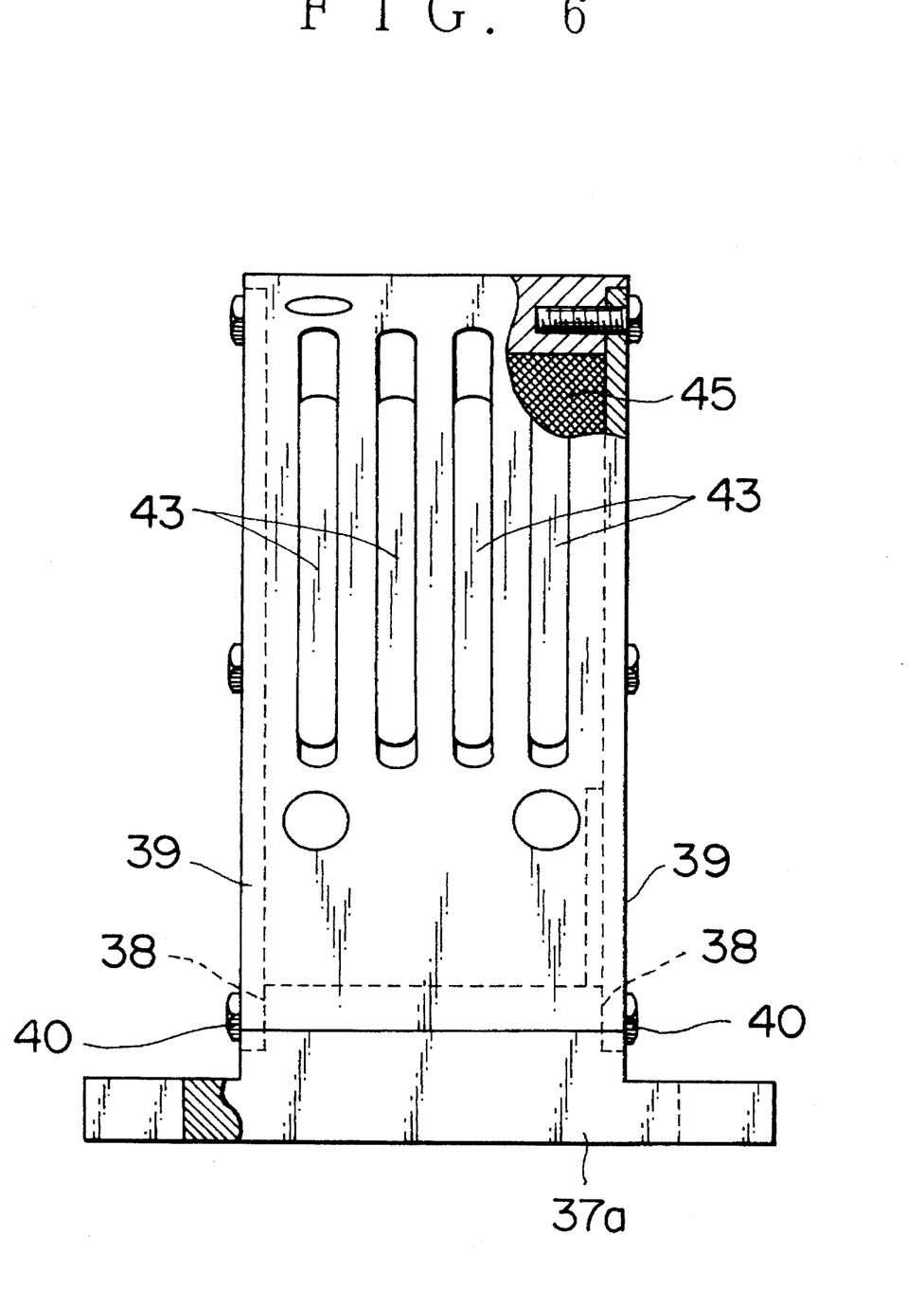
FIG. 6 is a partially-broken side view of a seed stirring case.

FIGS. 5 and 6 are partially-broken front and side views of the first embodiment of the seed stirring case C. The seed stirring case C is composed of a seed vessel 35 and a stirring mechanism 36.

In the seed vessel 35, a cylindrical case 37 is provided with a fixing stand 37a at its lower end. On both end surfaces of the case 37, circular step portions 38 are peripherally formed. A cover 39 fit in the step portions 38 is fixed by bolts 40.

The cover 39 is made of transparent plastic so that the floating state of a large number of seeds accommodated internally within the case can be easily observed.

Above the case 37, an opening 41 which is located just below the seed sucking nozzle 28 is provided. In FIG. 5, in the internal periphery on the left side, an arc recess 42 which is in parallel to the internal periphery is formed. On the peripheral wall which is thinned by the recess 42, four long ventholes 43 along the axial direction of the case 37 are arranged in parallel, and four holes 44 are formed at four corners.

The internal surface of the thinned peripheral wall is covered with a mesh 45 on which a mesh holder 46 abuts.

The mesh holder 46 is provided with ventholes (not shown) having the same shape at the positions corresponding to the ventholes 43 and with holes 47 at the positions corresponding to the holes 44. The mesh holder 46 is fixed to the case 37 by a ribit 48 which penetrates through the holes 44 and 47.

The air within the case 37 can pass through the long ventholes 43 and the mesh 45 whereas the seeds within the case 37 cannot pass through the mesh 45.

An explanation will be given of the mechanism 36 for stirring seeds. At the upper portion of the right side of the case, a flange attachment surface 49 is formed through which an air nozzle passing through hole 50 penetrates.

On the flange attachment surface 49, a spacer 51, a flange 53 with an air jet nozzle 52 fit therein and another flange 54, having a screw hole in which a tube joint for the air jet nozzle 52 is screwed, are stacked. Through the holes formed in the spacer 51, and the flanges 53 and 54, a bolt 55 is passed. The tip of the bolt 55 is screwed to the screw hole formed in the flange attachment surface 49. The spacer 51 and flanges 53 and 54 are fixed on the flange attachment surface 49.

The tip of the air jet nozzle 52 is located at a position higher than the seeds accommodated within the case 37. When air is jetted from the air jet nozzle 52, the seeds float upwards while they are stirred. The jet air is exhausted externally via the long ventholes 43 and mesh 45.

The seed stirring case C described above intends to stir seeds using the jet air. But it may have such a structure as supports the seed vessel 35 by an electric or air vibration generating device to vibrate the seed vessel 35, thereby stirring and floating the internal seeds.

An explanation will be given of the action of the seed supply mechanism for the seed coating/processing apparatus constructed as described above in the order of operation. A large number of seeds are accommodated within the case 37 of the seed vessel 35. Just above the opening 41 of the case 37, the one sucking nozzle 28 (on the right side in FIG. 1) is located whereas just above the nozzle plunger 8 (FIG. 7) of the gel extruding mechanism B, the other sucking nozzle 28 is located.

When air is jetted from the air jet nozzle 52, the seeds accommodated within the case 37 are stirred and a part thereof float upwards.

On the other hand, the air cylinder 25 on the right side in FIG. 1 operates, the rod 25a falls, the seed sucking nozzle 28 passes through the opening 41 to intrude into the case 37 and stop there. Then, the exchanging valve 34 operates to communicate the seed sucking nozzle 28 with a negative pressure source so that the internal pressure of the seed sucking nozzle 28 becomes negative.

The interval among the seeds when they float within the case 37 becomes much larger than that when they don't float but remain on the bottom of the case 37. Thus, only one (rarely two or three) seed is most adjacent to the seed sucking nozzle 28.

The floating seeds are in a state where they are likely to move by slight sucking force. Therefore, only one seed most adjacent to the seed sucking nozzle 28 is sucked by the seed sucking nozzle 28 to close its tip. As the negative pressure within the seed sucking nozzle 28 is increased, because the tip of the seed sucking nozzle 28 is closed by the seed, other seeds will not sucked by the nozzle 28.

Next, the fact that the negative pressure within the seed sucking nozzle 28 has been increased because of the suck of a seed is detected by a pressure sensor provided at the positive air pressure source or negative air pressure source. In response to the detected signal, the air cylinder 25 operates to raise the rod 25 and seed sucking nozzle 28. The rotary actuator 22 rotates by 180° so that the seed sucking nozzle 28 having sucked the seed is located at a position just above the nozzle plunger 8 of the gel extruding mechanism B.

Then, the other seed sucking nozzle 28 is located just above the opening 41 of the case 37.

The exchanging valve 34 stops supply of the negative pressure to the seed sucking nozzle 28 so that the seed passes through the nozzle plunger 8 of the gel extruding mechanism B, and dropped and supplied into the gel film formed below the nozzle plunger 8.

Then, the other seed sucking nozzle 28 is inserted into the case 37 to suck a seed.

In order to drop the seed on the gel film surely, the exchanging valve 34 may supply air pressure to the seed sucking nozzle 28.

When the seed is supplied to the gel film hanging down because of its own weight, the nozzle plunger 8 rises to extrude the gel to cover the upper portion of the gel film. Thus, the cover grain including a seed and bubble is formed. The cover grain whose weight has been increased owing to added gel drops, and forms a ball during dropping. Subsequently, the cover grain is supplied to a lower hardening bath.

As described above, the seed supply device according to the present invention and gel extruding mechanism B are operated in synchronism with each other so that the coating/processing of seeds can be carried out automatically successively.

I claim:

1. A seed supply and a stand having a surface;

a rotary actuator mounted on said surface, said rotary actuator having a rotary shaft;

a rotary arm fixed to said rotary shaft of said rotary actuator;

cylinders fixed to both ends of the rotary arm so that a rod of each cylinder is downward, each cylinder moving vertically;

first and second seed sucking nozzles attached to a respective lower end of each rod;

a pipe connected to each seed sucking nozzle, said pipe communicating with a positive air pressure source and a negative air pressure source;

a seed stirring case mounted on one side of Said stand, said seed stirring case including a seed vessel having an opening and said seed vessel accommodating seeds, said seed vessel is disposed in communication with the first seed sucking nozzle at a rotating end;

a stirring mechanism mounted on said one side of said stand, said stirring mechanism for stirring seeds in said seed vessel so that the seeds float; and a gel extruding mechanism mounted on another side of said stand, said gel extruding mechanism for coating apparatus comprising: for extruding gel and coating a seed, said gel extruding mechanism disposed below the second seed sucking nozzle at the rotating end, wherein said rotary arm rotates by 180° to locate said seed sucking nozzles at positions corresponding to said stirring case and said gel extruding mechanism and when said first seed sucking nozzle is at said position corresponding to said Stirring case, said cylinder of said first seed sucking nozzle moves vertically downward wherein said first seed sucking nozzle is lowered into said opening of said seed vessel to retrieve a seed to be coated by gel extruding mechanism 2. A seed supply mechanism and coating apparatus according to claim 1, wherein said stirring mechanism is an air jet nozzle whose front end is inserted into said seed vessel and whose rear end communicates with said positive air pressure source through an opening/closing valve.

3. A seed supply and coating apparatus according to claim 2, wherein a tip of said air jet nozzle is located at a position vertically higher than the seeds accommodated in said case.

4. A seed supply and coating apparatus according to claim 1, wherein said stirring case is provided with a vent hole.

* * * * *